(12) United States Patent
Milner et al.

(10) Patent No.: US 7,674,568 B2
(45) Date of Patent: Mar. 9, 2010

(54) SOLVENT COMPOSITIONS AND PROCESS FOR MANUFACTURING AN OPTICAL RECORDING MEDIUM USING SAID COMPOSITION AND OPTICAL RECORDING MEDIUM

(75) Inventors: Bruce Milner, Cambridge (GB); Jitka Brynjolffssen, Royston (GB); Timothy Parks, Huntingdon (GB); Wolfgang Freitag, Münchenstein (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 1017 days.

(21) Appl. No.: 10/533,614

(22) PCT Filed: Jan. 21, 2003

(86) PCT No.: PCT/EP03/00541

§ 371 (c)(1),
(2), (4) Date: Sep. 29, 2005

(87) PCT Pub. No.: WO03/034146

PCT Pub. Date: Apr. 24, 2003

(65) Prior Publication Data

US 2006/0105133 A1    May 18, 2006

(30) Foreign Application Priority Data

Nov. 1, 2002    (GB) .................................. 0225471.2

(51) Int. Cl.
*G11B 7/24*    (2006.01)

(52) U.S. Cl. ............................ 430/270.14; 430/270.16; 430/945; 369/288; 369/284; 428/64.8

(58) Field of Classification Search ........................ None
See application file for complete search history.

(56) References Cited

U.S. PATENT DOCUMENTS 2,359,737 A * 10/1944 Lacey et al. ................. 540/139
3,560,249 A    2/1971 Chereshkevich et al. ... 117/93.4
4,459,233 A * 7/1984 Fabian et al. ................ 540/140

(Continued)

FOREIGN PATENT DOCUMENTS

FR    1600332    *    8/1970
JP    2002-109793    *    4/2002

OTHER PUBLICATIONS

Derwent Abstr. 1988-053387 for JP 63009576 (1988).

(Continued)

*Primary Examiner*—Martin J Angebranndt
(74) *Attorney, Agent, or Firm*—Joseph C. Suhadolnik

(57) ABSTRACT

The present invention relates to a new solvent composition useful in the process of manufacturing an optical recording medium. The invention provides a new liquid composition comprising from 0.1 to 20% by weight of a dye having a solid state absorption band maximum in the spectral region from 300 to 800 nm, from 0.5 to 99.9% by weight of a compound of formula (I), wherein $R_1$ to $R_8$ are H, $CH_3$ or $C_2H_5$, with the proviso that the total number of carbon atoms in $R_1$ to $R_8$ is 0, 1 or 2, and optionally from 0 to 99.4% by weight of one or more further components, all based on the weight of the solution. The instant solvent composition enables to manufacture an optical recording medium of a single recording layer type capable of recording and playing a large volume of information using commercially available compact disc recorders and players and of superior performance in an amazing wide range of drive speeds. A further subject-matter is an optical recording disk with improved groove filling and preferably particular groove geometry.

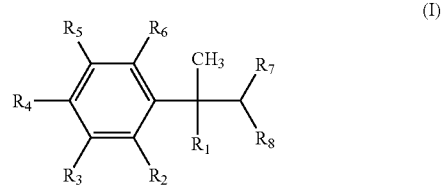

(I)

20 Claims, 2 Drawing Sheets

U.S. PATENT DOCUMENTS

| | | | |
|---|---|---|---|
| 4,943,681 A | 7/1990 | Sato et al. | 430/495 |
| 5,124,067 A | 6/1992 | Itoh et al. | 252/299.2 |
| 5,283,094 A | 2/1994 | Sasakawa et al. | 428/64 |
| 5,358,833 A | 10/1994 | Itoh et al. | 430/495 |
| 5,633,106 A | 5/1997 | Aihara et al. | 430/21 |
| 6,348,250 B1 | 2/2002 | Wang et al. | 428/64.1 |
| 6,399,768 B1 | 6/2002 | Wolleb et al. | 540/140 |
| 7,332,261 B2 * | 2/2008 | Seino et al. | 430/270.16 |

OTHER PUBLICATIONS

Derwent Abstr. 1981-06981D for JP 55152769 (1980).
Derwent Abstr. 1981-06980D for JP 55152768 (1980).
Derwent Abstr. 1977-54586Y for JP 52072627 (1977).
Derwent Abstr. 1990-198255 for JP 02132168 (1990).
Derwent Abstr. 1987-331365 for JP 62236875 (1987).
English language abstract for TW 448440 (2001).

* cited by examiner

SOLVENT COMPOSITIONS AND PROCESS FOR MANUFACTURING AN OPTICAL RECORDING MEDIUM USING SAID COMPOSITION AND OPTICAL RECORDING MEDIUM

The present invention relates to a new solvent composition useful in the process of manufacturing an optical recording medium. More particularly, the instant solvent composition enables to manufacture an optical recording medium of a single recording layer type capable of recording and playing a large volume of information using commercially available compact disc recorders and players and of superior performance in an amazing wide range of drive speeds.

As optical recording media, there are known read-only-media in which information has been recorded in advance and only reproduction is possible, writable media in which information can be recorded and reproduced, and rewritable media in which information can be recorded and the information thus recorded can be reproduced, erased or overwritten. Among them, writable (write once) media are generally inexpensive and excellent in durability as compared with the rewritable media. Therefore, the writable media are widely used for recording and storing large volume of data, for example music and images.

The optically writable medium has a recording layer on a substrate, which most usually consists of a metal such as Te or Bi, a cyanine or phthalocyanine dye, or the like. Phthalocyanine dyes have generally much superior stability to light, heat and humidity, as compared with cyanine dyes. Information can be recorded in the recording layer by irradiating with a laser beam to cause a physical or chemical change (pit formation) in the layer. The pits are read out with a laser beam with lower energy than that used for recording and thereby the information can be reproduced.

Among the optically writable media, there have been developed media, called CD-R, recordable by so called CD-R and CD-RW recorders, including audio recorders, and capable of being read out by those recorders and by read-only computer drives as well as by commercially available compact disc (CD) players.

Writable media which can be read out by CD players are for example described in Optical Data Storage 1, 989, Technical Digest Series Vol. 1, 45 (1989), EP-A-0 353 393 and EP-A 0 410 879. The media are of a single recording layer type comprising a substrate with a groove structure, a recording layer composed of an organic dye, a metal reflective layer and a protective layer.

The object of the present invention is to provide a manufacturing process and a recording medium which has improved reflectivity, signal modulation, and power margin over a wide range of recording speeds.

The dye of the above-mentioned medium is usually spin-coated because of the good uniformity and economy of this method. In order for the dye to be spin-coated, the dye has to be soluble in an appropriate concentration in an organic solvent. This dye solution must be able to coat the substrate uniformly over its entire area and to provide an adequate filling of the groove in the substrate, leading to the required difference in reflectivity between the groove areas and the so called land areas in order to obtain a high quality medium. But the solvent should not or only minimally damage the grooves of the substrate, which is typically polycarbonate or polymethyl methacrylate. However, finding a compromise between high solubilizing power for the dye and low damage to the substrate is highly difficult.

Non-polar organic solvents have been proposed for phthalocyanine dyes, for example aliphatic hydrocarbons, such as methylcyclohexane, dimethylcyclohexane, ethylcyclohexane, or ethers, for example di-n-butylether. Co-solvents can be blended with such non-polar primary solvents and include, for example, alcohols such as propanol, butanol, pentanol, hexanol, octanol, ethers like tetrahydrofurane, ketones, like methyl isobutyl ketone, di-isobutyl ketone, cyclohexanone, aromatic hydrocarbons, like toluene, ethylbenzene, xylene and trimethylbenzene and very recently esters like methyl lactate (CH 2002 829/02).

EP-A-0 373 643 discloses the use of dibutyl ether, n-octane, cyclohexane, methylcyclohexane, toluene and xylene as solvents for coating phthalocyanine dyes on polycarbonate optical disks.

U.S. Pat. No. 4,943,681 discloses the use of cyclohexene as a solvent for spin-coating phthalocyanine dyes on polycarbonate optical disks.

EP-A-0 511 598 discloses solvents and solvent systems having a boiling point of 180° C. or less as well as a Hildebrand solubility parameter of 8.5 or less. These "nonpolar" solvent systems are preferably applied to nonpolar soluble phthalocyanine dyes, which have alkyl, alkoxy, alkylthio and trialkylsilyl-substituents attached to the phthalocyanine chromophor. Solvents having a low solubility parameter, amongst which n-octane and methylcyclohexane are again disclosed, may be used in mixture with solvents having a higher solubility parameter, amongst which ethylbenzene. The low quantity of solvent remaining in the layer after drying is said to improve the sensitivity and the jitter.

TW-A-448440 teaches that Ciba IRGAPHOR® Super-green OS, a palladium phthalocyanine dye manufactured by Ciba Specialty Chemicals Inc., is preferably applied by dissolution into lower alcohols, ethers or cycloaliphatic hydrocarbons (for example methylcyclohexane) as primary solvent, followed by admixing a polar secondary solvent selected from heptanol, octanol, nonanol, 2,6-dimethyl-4-heptanone, diacetone alcohol, tetrahydrofurane and acetonitrile.

U.S. Pat. No. 6,348,250 discloses a mixture of 90% by volume of methylcyclohexane or dibutyl ether and 10% by volume of 1-propanol. WO 00/09522 discloses a mixture of 98% by volume of methylcyclohexane or di-n-butylether and 2% by volume of 2,6-dimethyl-4-heptanone.

U.S. Pat. No. 6,452,899 discloses a DVD-R geometry with a groove filling index of 0.2 to 0.4, which corresponds to high thicknesses of dye both in the groove and nearby on land.

Thus, a manifold of solvents and solvent combinations have been proposed in the art. However, none of the so far known solvents is fully satisfactory in terms of a combination of excellent solubility of the dye, stability of the solution, coating and drying properties, as well as high groove filling of the substrate groove.

Although the known processes of spin-coating organic solvent soluble non-polar phthalocyanine dyes in known solvent systems lead to recording media suitable for lower recording speeds or limited multi-speed ranges, such approaches are no more fully satisfactory for today's wider speed range of recording speeds from 2× or even 1× up to the very high speed of today's recorders (48×, 52× and beyond).

Figure 1:
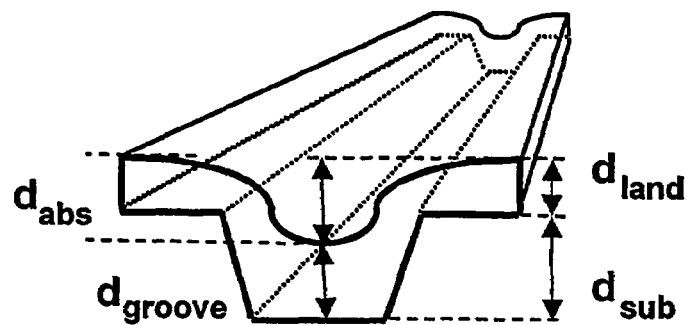
FIG. 1 shows a view in perspective of a groove segment showing the depth of the groove and the thickness of the dye layer in the groove and land areas of the disc.

A solvent composition was now created, which has surprisingly better overall properties for spin-coating phthalocyanine dyes. This new solvent composition can increase substantially the groove filling, i.e. the thickness ratio of the dye in the groove to the dye on the land, above and beyond that of any known solvent system currently in use. There is more dye in the grooves and less dye on land areas. The increased groove filling results in an increase in the recorded reflectivity and signal modulation, and a broader power margin for discs with similar layer thickness.

This increased groove filling also allows the groove depth of the substrate to be increased, improving further the signal modulation, whilst maintaining the recorded reflectivity, which drops with depth, comfortably in specification. If desired, the groove width may simultaneously be decreased. With solvent systems known hitherto possible increases in groove depth were very much limited by the drop of reflectivity below specification limit due to insufficient groove filling by the dye. As modulation is one of the principle limiting parametric characteristics at extreme high and low recording speeds, this possibility enhances the multispeed recording capability of the resulting media.

For a given groove depth, the improved groove filling also can lead to a reduced the amount of dye per disc and thus improves the economy of industrial disc production.

Furthermore, the formation of peroxides when contacted with air and light and elevated temperature for a prolonged period of time, as it is not uncommon in industrial use, is entirely avoided or decreased to an acceptable low level even without addition of antioxidants and/or radical scavengers.

Hence, the invention pertains to a liquid composition comprising from 0.1 to 20% by weight of a dye having a solid state absorption band maximum in the spectral region from 300 to 800 nm, from 0.5 to 99.9% by weight of a compound of formula

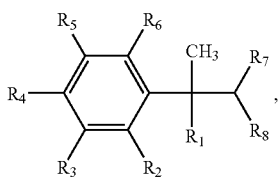

wherein $R_1$ to $R_8$ are H, $CH_3$ or $C_2H_5$, with the proviso that the total number of carbon atoms in $R_1$ to $R_8$ is 0, 1 or 2, and optionally from 0 to 99.4% by weight of one or more further components, all based on the weight of the solution.

The compound of formula (I) is for example cumene, o-cymene, m-cymene, p-cymene, sec-butylbenzene, tert-butylbenzene, 2-pentylbenzene, isopent-2-ylbenzene or tert-amylbenzene, or a mixture thereof, for example a mixture of homologues, positional isomers and/or where applicable enantiomers. The compound of formula (I) has preferably a boiling point of from 150 to 180° C. under atmospheric pressure. Most preferred are sec-butylbenzene and especially tert-butylbenzene.

The total number of carbon atoms in $R_1$ to $R_8$ is preferably 1 or 2, much preferred 1.

The dye having a solid state absorption band maximum in the spectral region from 300 to 800 nm is preferably a phthalocyanine, most preferred being a nonpolar phthalocyanine.

The optional further components can be any known in the art, but preferably comprise a liquid in which the dye is soluble at 25° C., which liquid further has most suitably a boiling point lower than that of the compound of formula (I). The amount of further liquid medium is preferably at least 20% by weight, based on the weight of the composition. Preferred further liquids are linear, branched and/or cyclic non-aromatic hydrocarbons, which can be saturated or optionally have from 1 to 3 double bonds. Most preferred are alicyclic hydrocarbons, in particular cycloalkanes substituted by one or more $C_1$-$C_4$alkyl groups and/or having a boiling point of ≦170° C., especially methylcyclohexane, 1,2-dimethyl cyclohexane or ethyl cyclohexane.

As liquid composition, it is understood a solution, which may be either a clear solution or a solution also comprising suspended particles whose size is fine enough to pass through a 0.2 μm filter, preferably particles of mass below about 10 μg (corresponding to a size below about 54 nm for spherical particles).

Further preferences are disclosed in relationship with other aspects of the invention.

Compositions further comprising a nonpolar solvent are also new. Hence, the invention pertains to a liquid composition comprising from 0.1 to 20% by weight of a dye having a solid state absorption band maximum in the spectral region from 300 to 800 nm, from 0.5 to 79.9% by weight of a compound of formula

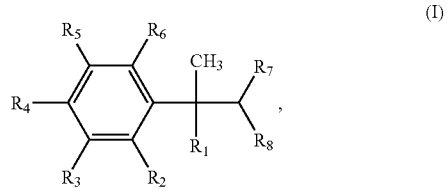

wherein $R_1$ to $R_8$ are H, $CH_3$ or $C_2H_5$, with the proviso that the total number of carbon atoms in $R_1$ to $R_8$ is 0, 1 or 2, from 20% to 99.4% by weight of a linear, branched and/or cyclic non-aromatic hydrocarbon, and optionally from 0 to 79.4% by weight of one or more further components, all based on the weight of the solution.

According to the present invention, there is provided a process for manufacturing an optical recording medium comprising a substrate with a grooved side, a recording layer overlying the substrate on the grooved side, a reflective layer overlying the recording layer, and a protective layer overlying the reflective layer, wherein the recording layer is produced by coating a liquid composition comprising from 0.1 to 20% by weight of a dye having a solid state absorption band maximum in the spectral region from 300 to 800 nm, from 0.5 to 99.9% by weight of a compound of formula

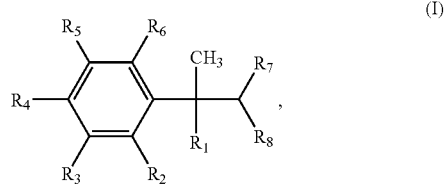

wherein $R_1$ to $R_8$ are H, $CH_3$ or $C_2H_5$, with the proviso that the total number of carbon atoms in $R_1$ to $R_8$ is 0, 1 or 2, and optionally from 0 to 99.4% by weight of one or more further components, all based on the weight of the solution.

The dye solution for the recording layer preferably also comprises from 20% to 99.4% by weight of a linear, branched and/or cyclic non-aromatic hydrocarbon, in particular an alicyclic hydrocarbon, in a preferred weight ratio of from 4:1 to 99:1, most preferred from 17:1 to 76:1, to the compound of formula (I).

The optical recording medium has preferably a single recording layer.

The structure of the optical recording medium of the present invention is suitably such that a recording layer capable of forming a pit by absorbing a laser beam is provided on a transparent substrate which has a groove and a reflective layer is provided on top of the recording layer so as to enhance the reflectivity and furthermore a protective layer is formed on the reflective layer in order to protect the recording layer and the reflective layer.

As material for the substrate, there can be used any material capable of transmitting a laser beam, for example at 780, 635, 658 or 405 nm, and usable for optical recording media. Examples of suitable substrate materials include polymers such as polycarbonate resins, acrylic resins, polystyrene resins, polyvinyl chloride resins, epoxy resins, polyester resins, amorphous polyolefin resins, and inorganic materials such as glass. These materials are formed into a substrate having a groove by means of injection moulding or by a method using a photopolymer. Most usual substrates are polycarbonate or acrylic resins and the like. The solvent system according to this invention does not dissolve or swell these substrate materials, thus does not damage the groove and provides superior groove filling with the dye.

As the dye used for the recording layer of the present invention, nonpolar solvent-soluble substituted phthalocyanine dyes are preferable for recordable CD (CD-R) because of the good match of their optical properties with the most common semiconductor laser wavelength, which is typically 780 nm, and their superior light stability and humidity and heat resistance under harsh conditions.

As the nonpolar solvent-soluble substituted phthalocyanine dye, there may be mentioned, for example, alkyl substituted phthalocyanine, alkoxy substituted phthalocyanine, alkylthio substituted phthalocyanine, trialkylsilyl substituted phthalocyanine, halogenated phthalocyanine derived from the above-mentioned substituted phthalocyanine and phthalocyanine having metallocenyl groups attached to the chromophor of the phthalocyanine. Among them, alkoxy substituted phthalocyanine, alkylthio substituted phthalocyanine, halogenated phthalocyanine and ferrocenyl-group substituted phthalocyanine derived from these substituted phthalocyanines are preferable. Most preferably, the phthalocyanines have from 4 to 10 identical or different substituents.

More particularly, such substituted phthalocyanine dyes are described for example in EP-A-0 337 209, EP-A-0 373 643, U.S. Pat. No. 6,399,768, EP-A-0 600 427, U.S. Pat. No. 5,693,396 and EP-0 519 419. The substituted phthaloyanines may be used alone or in combination, especially as mixtures of isomers and/or homologues. Preferred are metal phthalocyanines, most preferred copper or palladium phthalocyanines.

The concentration of the dye in the instant liquid composition is usually from 0.5 to 5% by weight, more preferably from 1 to 3% by weight, and most preferably from 1 to 2% by weight, based on the composition. As far as the effect of the present invention is not adversely affected, there may be further added, for example, known aromatic or unsaturated aliphatic diamine type metal complexes, aromatic or unsaturated aliphatic diol type metal complexes, metallocene type compounds, like benzoyl ferrocene, acetyl ferrocene, propyl ferrocene and the like, polymethine dyes, azo-dyes, other types of phthalocyanine dyes and azo-metal complex dyes, dyes for coloration of the recording layer, polymeric binders, wetting agents or the like in an amount of preferably from 0 to 30% by weight, more preferably from 0 to 20% by weight.

The above mentioned components are formed into a thin, regular layer on the groove side of the substrate to form the recording layer, preferably by spin-coating. Upon forming the recording layer, its thickness is adjusted by varying the coating parameters so as to obtain sufficient reflectivity after forming a reflective layer. The instant compositions have low viscosity and fast evaporation rate, so that they are well suited for fast coating of substrates, necessary in today's production. Especially when used with non-polar dyes, they generally provide satisfactory wetting of substrates and adequately uniform dye distribution, which the skilled artisan will routinely further optimize by varying the coating conditions.

FIG. 1 shows a view in perpective of a groove segment showing the depth $d_{sub}$ of the empty groove, the thickness $d_{groove}$ of the dye layer in the groove, the thickness $d_{land}$ of the dye layer ontop the land areas of the disc and the depth difference $d_{abs}$ between the surface of the dye layer in the groove and the surface of the dye layer ontop the land areas of the disc. The groove filling value ($GF_V$) and groove filling grade ($GF_G$) can be defined as $$GF_V = \frac{d_{groove} - d_{land}}{OPD \cdot 1 \text{ nm}} = \frac{d_{sub} - d_{abs}}{OPD \cdot 1 \text{ nm}} \text{ and } GF_G = \left\{1 - \frac{d_{land}}{d_{groove}}\right\} \cdot 100,$$

respectively.

As $GF_V$ is dimensionless, $d_{sub}$ and $d_{abs}$ should be both given in nm. Typical ranges for examples according to this invention are for example, 200 to 225 nm for $d_{sub}$, 100 to 125 nm for $d_{abs}$ and 0.21 to 0.27 for OPD (optimum values for CD-R media comprising phthalocyanine dyes).

The average optical density of the recording medium (OPD) is the average value across the recording medium, including both the groove and the land areas surrounding the groove within a distance of up to 1 µm from the groove's edge, at a wavelength 110 nm lower than the wavelength at which the recording medium is suitable to be recorded and obtainable for example with a Biref 126™ scanner (Dr. Schenk).

The optical density is $-\log_{10}$ of the detected quantity of light transmitted through the dye-coated substrate and is directly measurable by spectrophotometry. It is also highly desirable to determine the groove filling for the dye layer. For a given groove geometry, the groove filling determines the ratio of dye thickness in the groove ($d_{groove}$) to dye thickness on the land ($d_{land}$). These characteristics being difficult to measure accurately in practice, it is customary to define the relationship by parameters such as groove depth ($d_{sub}$), optical density OPD of the dye layer and the depth of the groove retained by the absorber ($d_{abs}$). The $d_{abs}$ is a value for the retained depth in the groove after dye deposition and can be calculated in known manner from the intensities of the $0^{th}$ and $1^{rd}$ order of the diffracted light beam.

Figure 2:
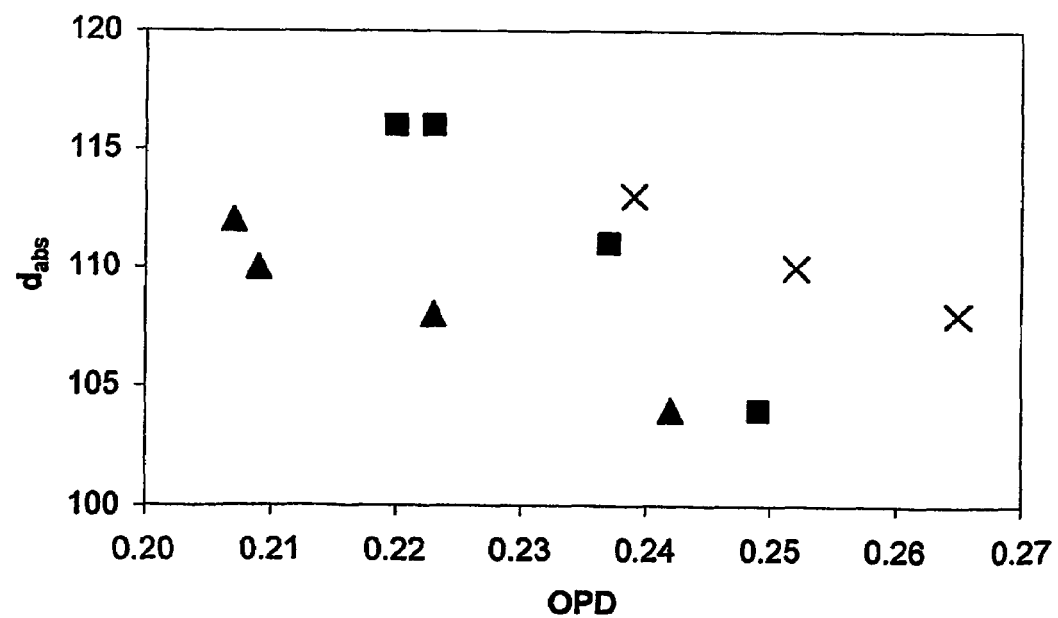
FIG. 2 illustrates the relationship between $d_{abs}$ and OPD for two inventive and one comparative solvent systems.

In the current working optical density range and for a given groove geometry and solvent system, the relation between dye layer optical density and the $d_{abs}$ is approximately linear. $d_{abs}$ decreases as the absorbance increases. The relationship between $d_{abs}$ and OPD is illustrated in FIG. 2 for two instant and one comparative solvent systems. The triangles (▲) are for methylcyclohexane/tert-butylbenzene 98:2 (1.5% IRGAPHOR® Ultragreen MX), the squares (■) for methylcyclohexane/tert-butylbenzene 99:1 (1.5% IRGAPHOR® Ultragreen MX) and the crosses (×) for di-n-butylether/2,6-dimethyl-4-heptanone 93:7 (3.0% IRGAPHOR® Ultragreen MX).

Different solvent systems have different groove filling ability and deposit the dye in the groove and on the land at different ratio. When there is more dye in the groove for a given optical density, $d_{abs}$ is lower and the groove filling is increased, and conversely. Substrates coated with the same solvent and optical density, but of different groove depth, lead to different $d_{abs}$ values.

The present invention advantageously leads to improved optical recording media having a groove filling value $GF_V$ of from 360 to 600, preferably from 380 to 500, or wherein the groove filling grade $GF_g$ is from 85 to 100, preferably from 90 to 100, most preferred from 95 to 100. Such media were hitherto out of reach.

Hence, the invention also relates to an optical recording medium comprising a substrate with a grooved side, a recording layer overlying the substrate on the grooved side, a reflective layer overlying the recording layer, and a protective layer overlying the reflective layer, characterized in that it has a groove filling value $GF_V$ of from 360 to 600. The recording layer of this optical recording medium preferably comprises a phthalocyanine dye or a mixture of phthalocyanine dyes. Preferably, it consists of at least 50% by weight, most preferably at least 80% by weight, of a phthalocyanine dye or a mixture of phthalocyanine dyes.

In a further embodiment of the present invention, the above described process leads to an optical recording medium comprising a substrate with a groove and a recording layer, characterised in that the groove filling grade $GF_g$ is from 85 to 100, preferably from 90 to 100, most preferred from 95 to 100. Preferably, such media also comprise a reflective layer and/or a protective layer, for example in the arrangement as above but also in alternative or inverse arrangements, such as those customary in DVD-R, ™Blu-Ray or ™Blue Laser recording media usable at laser wavelength from 300 to 700 nm, preferably at about 405 or about 658 nm.

In a preferred embodiment of the present invention, the above described process is further characterised in that the groove in the substrate ($d_{sub}$) is from 200 to 225 nm deep and from 580 to 700 nm, preferably from 620 to 680 nm wide at half depth, the dye film average optical density is from 0.21 to 0.27, preferably from 0.21 to 0.25, and the depth in dye layer $d_{abs}$ lies in the range from 100 to 125 nm (the average optical density and $d_{abs}$ can be measured with a Biref 126™ scanner from Dr. Schenk at 670 nm). Independently or especially in combination with above groove geometry, the dye film has an average absorbance of from 0.37 to 0.57 at $\lambda_{max}$, suitably measured on a Perkin Elmer Lambda 2 spectrophotometer. For CD-R systems comprising phthalocyanine dyes and operating at 780 nm, usually $\lambda_{max}$ will be at about 730 nm and OPD will be measured at 670 nm.

Of course, the process and groove geometries can also be optimized for optical media recordable at other wavelengths, such as 658 or 405 nm, which comprise other recording dyes and other groove geometries. The benefit of improving the reflectivity and signal modulation with higher groove filling is as valid for DVD-R as it is for CD-R.

After spin-coating of the recording layer, the coated substrate is optionally dried. A wide range of drying conditions is applicable as long as the substrate or the recording layer is not damaged. Usually, in-line drying is performed on the industrial manufacturing lines, but also off-line, batch drying can be applied to remove remaining solvent. Drying conditions might be, just for example but in no way limitative, from 50° C. to 110° C. with drying times between 5 minutes and several hours.

A reflective layer is then coated or deposited on the recording layer. Typically, the reflective layer is a thin metal layer, preferably from Au, Ag, Pt, Cu, Al. The metal may be an alloy containing one or more of these metals. Mostly preferred are Ag and Ag alloys and Au and Au alloys. Further, in addition to the above mentioned metals, other metals such as Cr, Ni, Si, Ge, Pb, Pd, Sn, Sb may be used as auxiliary components.

For forming the metal layer, usually vacuum deposition is applied, such as sputtering. The thickness of the reflective layer is usually about from 20 to 200 nm.

Finally, a protective layer is coated on top of the reflective layer. The protective layer may be any kind of protective layer, as far as it can protect the reflective layer and the recording layer. For example, the protective layer may be composed of a polymeric material such as polycarbonate, an acrylic resin, polystyrene, polyvinyl chloride, an epoxy resin, a polyester resin or an inorganic coating. The protective layer can be glued onto the reflective layer by aid of an adhesive, or it can be laminated, spin-coated and UV-cured or—in case of inorganic coatings—vapour deposited. UV-cured acrylic resin is preferred. One or more protective layers can be combined. The thickness of the protective layer is usually from 2 to 50 μm. Finally, a label or any desired pattern can be printed onto the protective coating.

Optionally, there can be any number of additional layers, for example intermediate layers such as are known in the art.

The examples which follow illustrate the invention, without being limitative. Unless specified differently, all parts and percentages are by weight. A commercially available phthalocyanine dye (IRGAPHOR® Ultragreen MX, Ciba Specialty Chemicals, Inc.) is dissolved in an appropriate concentration in the below indicated solvent systems and coated onto a polycarbonate substrate as described below in more detail to obtain a dye layer of average optical density between 0.234 and 0.251 (absorbance at $\lambda_{max}$=0.45-0.51), indicating the same average dye thickness on the substrate.

EXAMPLE 1

A polycarbonate substrate 120 mm diameter and 1.2 mm thickness provided with a spiral groove with trackpitch 1.5 μm, groove depth 200 nm and groove width at ½ depth 680 nm (AFM) is coated with a solution of 1.9 parts of IRGAPHOR® Ultragreen MX, 93.7 parts of methylcyclohexane (MCH) and 4.4 parts of tert-butylbenzene (TBB) to provide the recordable layer. The dye layer OPD is 0.237 and the groove filling value is 400. The dried recording layer is sputtered with 85 nm of Ag on a CDI900 sputter coater and protected with UV curing lacquer 650-030 (DSM).

The discs are recorded in commercial recorders at speeds ranging from 2× to 48× and the results read in CDCATS SA3 (manufactured by Audio Development). The reflectivity $R_{top}$ (=$R_0 \times I_{top}/I_0$ as defined in the Orange Book, Part II: CDR/Volume 2) and the signal modulation $I_{11}/I_{top}$ are measured for both 2× and 48× recording speeds. High values of both reflectivity and signal modulation are desirable.

Results from 2× on CDD3610 and 48× on LTR 48125W, namely recorded reflectivity and signal amplitude of the longest recorded mark ($I_{11}$), i.e. the difference between the reflectivity of the unrecorded groove and the reflectivity of the recorded mark ($I_{11,LAND}$-$I_{11,PIT}$), are tabulated in Table 1. The CDCATS fails to read data recorded at 1× on Yamaha CRW6416.

For the power margins, the discs are recorded with varying laser power on DDU1000 (manufactured by Pulstec Corp., Japan) at 62.4 m/sec linear velocity, corresponding to 52× recording speed, and the data read back on CDCATS SA3. The laser power margin can be defined as an increase in Land 3T jitter from asymmetry 0 to asymmetry −10. Minimum increase is preferred. Increase in jitter above 10 ns is undesirable.

Figure 3:
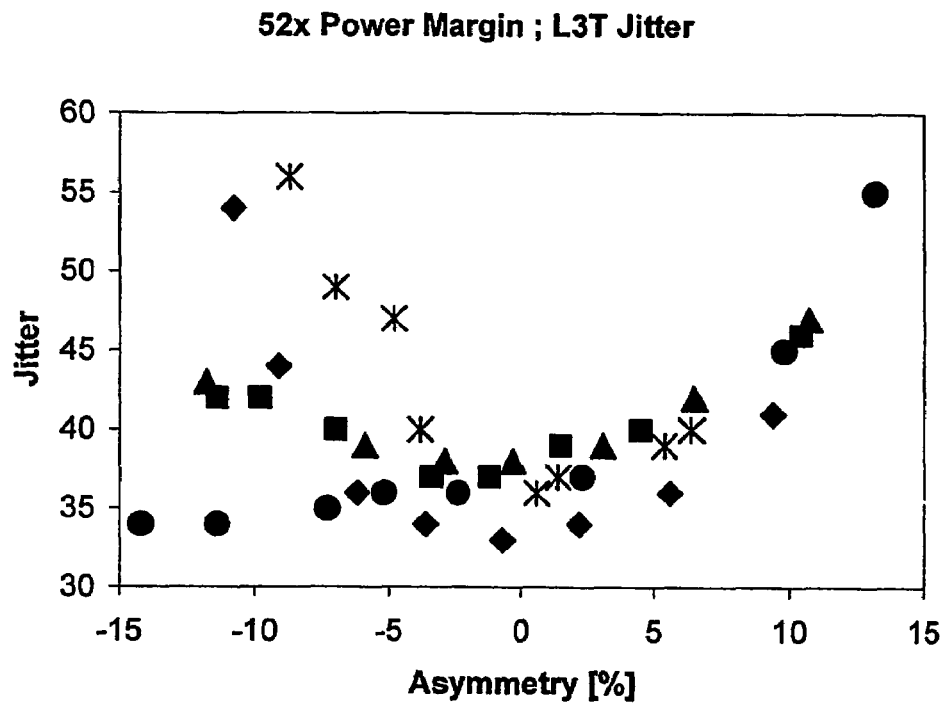
FIG. 3 illustrates the trend between asymmetry and Land 3T jitter for examples 2-4.
Figure 4:
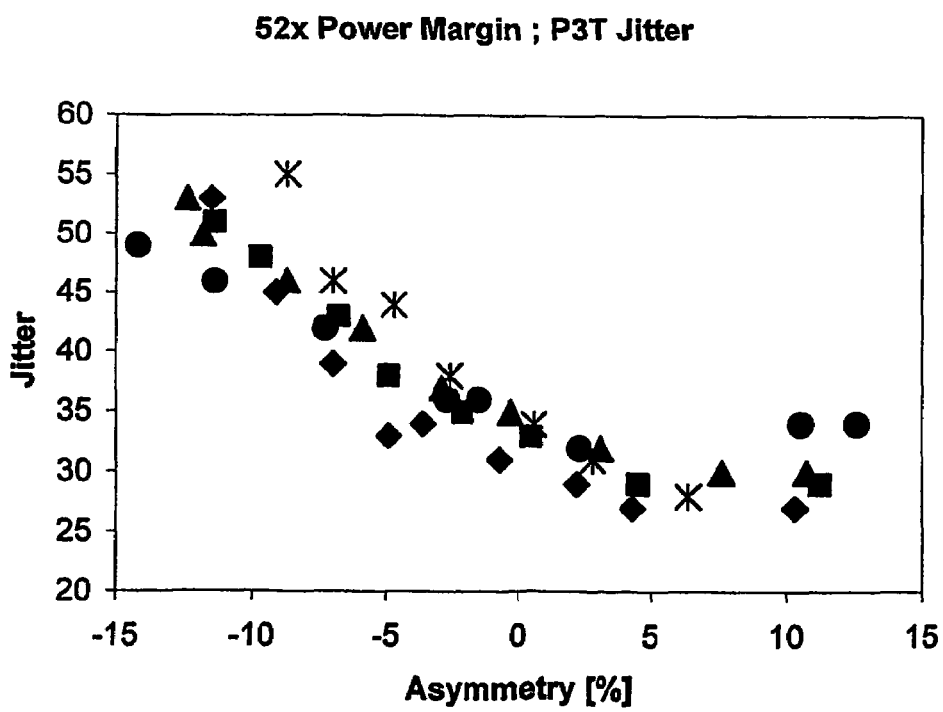
FIG. 4 illustrates the trend between asymmetry and Pit 3T jitter for examples 2-4.

The results for optical density, 2× and 48× reflectivity, 2× and 48× $I_{11}$ as well as 52× power margin are also given in Table 1. The groove filling grade ($GF_G$) is very good. The trend between asymmetry and Land 3T or Pit 3T jitter is illustrated in FIGS. 3 and 4, respectively. The values are shown by triangles (▲) for example 1, by squares (■) for example 2, by diamonds (♦) for example 3, by circles (●) for example 4, by stars (★) for comparative example 2 and by crosses (×) for comparative example 3. The asymmetry (expressed in %) is a measure for the relation between the $I_{11}$ and the $I_3$ center levels and is defined as follows in the Philips Reference measuring methods Specification Guidelines version 1.0/May 1999):

$$ASYM\ [\%] = \frac{Avg(I_{3,LAND} + I_{3,PIT}) - Avg(I_{11,LAND} + I_{11,PIT})}{Avg(I_{11})} \times 50.$$

EXAMPLE 2

An optical medium is prepared according to example 1, except that 95.9 parts of methylcyclohexane and 2.2 parts of tert-butylbenzene are used. The dye layer OPD is 0.234, the groove filling value ($GF_V$) is 400 and the groove filling grade ($GF_G$) is very good. The results from recording experiments as per example 1 are tabulated in Table 1.

EXAMPLE 3

An optical medium is prepared according to Example 1, except that 97.0 parts of methylcyclohexane and only 1.1 parts of tert-butylbenzene are used. The dye layer OPD is 0.247, the groove filling value ($GF_V$) is 370 and the groove filling grade ($GF_G$) is much satisfactory. The results from recording experiments as per example 1 are tabulated in Table 1.

EXAMPLE 4

An optical medium is prepared according to example 2, except that the substrate has a groove depth of 220 nm and a groove width at ½ depth of 660 nm (AFM). The dye layer OPD is 0.251, the groove filling value ($GF_V$) is 430 and the groove filling grade ($GF_G$) is excellent (negligible amount of dye on land). The data recorded at 1× speed on Yamaha CRW6416 read successfully in CDCATS. $I_{11}$ is 0.56 V, $I_{11}/I_{top}$ is 0.61 and reflectivity is 72.4%. The results from recording experiments as per example 1 are tabulated in Table 1.

COMPARATIVE EXAMPLE 1

Substrates are coated with IRGAPHOR® Ultragreen MX dye solution in similar manner as described in Example 1, except that 98.1 parts of methylcyclohexane is used but without tert-butylbenzene as a co-solvent. The dye layer OPD is 0.282, the groove filling value ($GF_V$) is 230 and the groove filling grade ($GF_G$) is very low. A too thick dye coating is obtained, indicated by the much higher dye layer absorbance. Therefore no meaningful comparative disc evaluation is possible.

COMPARATIVE EXAMPLE 2

An optical medium is prepared according to example 1, except that 3.7 parts of dye, 89.2 parts of di-n-butylether (DBE) and 7.0 parts of 2,6-dimethyl-4-heptanone (DMH, a usual solvent mixture) are used. The dye layer OPD is 0.250, the groove filling value ($GF_V$) is 350 and the groove filling grade ($GF_G$) is unsatisfactory. The results from recording experiments as per example 1 are tabulated in Table 1.

COMPARATIVE EXAMPLE 3

An optical medium is prepared according to example 1, except that 3.7 parts of dye, 93.2 parts di-n-butylether and 3.0 parts of 2,6-dimethyl-4-heptanone (a usual solvent mixture) are used. The dye layer OPD is 0.250, the groove filling value ($GF_V$) is 330 and the groove filling grade ($GF_G$) is unsatisfactory. The results from recording experiments as per example 1 are tabulated in Table 1.

TABLE 1

| | Dye [%] | Solvent 1 | Solvent 2 | solvent weight ratio | OPD | $GF_V$ | $GF_G$ | $R_{top}$ 2× [%] | $R_{top}$ 48× [%] | $I_{11}$ 2× [V] | $I_{11}$ 48× [V] | $I_{11}/I_{top}$ 2× | $I_{11}/I_{top}$ 48× | 52× power margin [ns] |
|---|---|---|---|---|---|---|---|---|---|---|---|---|---|---|
| Example | | | | | | | | | | | | | | |
| 1 | 1.9 | MCH | TBB | 96.4/3.6 | 0.237 | 400 | ≧90 | 72 | 71 | 0.55 | 0.60 | 0.61 | 0.68 | 5 |
| 2 | 1.9 | MCH | TBB | 98.2/1.8 | 0.234 | 400 | ≧90 | 72 | 69 | 0.55 | 0.59 | 0.60 | 0.67 | 3 |
| 3 | 1.9 | MCH | TBB | 99.1/0.9 | 0.247 | 370 | ≧85 | 71 | 64 | 0.54 | 0.58 | 0.60 | 0.71 | 21 |
| 4 | 1.9 | MCH | TBB | 98.2/1.8 | 0.251 | 450 | ≧95 | 72 | 68 | 0.61 | 0.67 | 0.67 | 0.74 | −2 |
| Comparative Example | | | | | | | | | | | | | | |
| 1 | 1.9 | MCH | — | 100/0 | 0.282 | 230 | <70 | | | | | | | |
| 2 | 3.7 | DBE | DMH | 92.7/7.3 | 0.250 | 350 | <85 | 68 | 67 | 0.51 | 0.63 | 0.59 | 0.74 | 20 |
| 3 | 3.7 | DBE | DMH | 96.9/3.1 | 0.250 | 330 | <85 | 60 | 62 | 0.45 | 0.54 | 0.59 | 0.69 | ⊙ |

⊙ disk track failure

Examples 1 to 3 have improved recorded reflectivity and signal modulation $I_{11}/I_{top}$, especially at low-speed (2×) recording. The laser power margin is significantly enlarged in examples 1 and 2, too. Particularly remarkable are the excellent results obtained with 1×, 2× and 48× recordings speeds, due the improved groove geometry of Example 4.

The instant advantages are also illustrated in FIGS. 3 and 4, which depict the variation of L3T jitter (52× power margin) and P3T, respectively, in function of asymmetry. Comparison of results of Examples 2 and 4 indicates that a greater groove depth of 220 nm and slightly reduced groove width of 660 nm at ½ depth results in better signal modulation ($I_{11}/I_{top}$) than for a shallower groove depth which is slightly wider. Thus, a combination of optimised groove geometry (width and depth) and high groove filling with values $GF_V$ in the range of 360-600 leads to significantly improved full multi-speed media performance.

EXAMPLES 5-8

It is proceeded in close analogy to examples 1-4, with the difference that IRGAPHOR® Supergreen OS (Ciba Specialty Chemicals Inc.) is used instead of IRGAPHOR® Ultragreen MX. The results are satisfactory.

EXAMPLES 9-12

It is proceeded in close analogy to examples 1-4, with the difference that HR 250™ (Mitsui Chem.) is used instead of IRGAPHOR® Ultragreen MX.

EXAMPLES 13-16

It is proceeded in close analogy to examples 1-4, with the difference that OPTLION® OPM 298 (Toyo Ink Manufacturing Co.) is used instead of IRGAPHOR®Ultragreen MX.

EXAMPLES 17-20

It is proceeded in close analogy to examples 1-4, with the difference that MY 317™ (Mitsui Chem.) is used instead of IRGAPHOR® Ultragreen MX.

EXAMPLES 21-24

It is proceeded similarly as in examples 1-4, with the difference that the red dye HRS 340™ (Mitsui Chem.) is used instead of IRGAPHOR® Ultragreen MX.

EXAMPLES 25-28

It is proceeded in close analogy to examples 1-4, with the difference that the dye according to example 15 of EP-1,104,431 is used instead of IRGAPHOR® Ultragreen MX. The results are satisfactory.

EXAMPLES 29-32

It is proceeded in close analogy to examples 25-28, with the difference that the dye according to example 3 of WO-02/083796 is used instead of the dye according to example 15 of EP-1,104,431. The results are excellent.

EXAMPLE 33

A solution of 3.0 g of the DVD-R dye HRS 340™ (Mitsui Chem.) in 100 g of a binary mixture of ethylcyclohexane and tert.-butyl benzene (32:3 by weight) is spin coated onto a substrate with a groove depth of 172 nm, leading to a dye film with $d_{abs}$ of 76-79 nm and optical density 0.79-0.84 at $\lambda_{max}$ ($d_{abs}$ measured by ARGUS/Aeco Ltd., Powys, UK and absorbance measured spectrophotometrically). The groove filling grade ($GF_G$) is good.

COMPARATIVE EXAMPLE 4

It is proceeded in close analogy to example 33, with the difference that a prior art binary mixture of ethylcyclohexane and cyclooctane (11:1 by weight) is used as solvent for spin-coating. $d_{abs}$ is 78-91 nm at $\lambda_{max}$. The groove filling grade ($GF_G$) is unsatisfactory.

EXAMPLE 34 (Groove Damage)

One milliliter of a solvent mixture consisting of 95 volume parts of methyl cyclohexane and 5 volume parts of the indicated aromatic co-solvent are spin-coated for identical time onto a polycarbonate disc having a pre-formed groove on it. The groove depth at four radii is measured before and after the solvent washing and the groove depth difference collated in Table 2.

TABLE 2

| primary solvent | secondary solvent | volume ratio | groove depth difference [nm] |
|---|---|---|---|
| methylcyclohexane | — | 100/— | 0.5 |
| methylcyclohexane | o-xylene | 95/5 | 45.5 |
| methylcyclohexane | ethylbenzene | 95/5 | 12.7 |
| methylcyclohexane | cumene | 95/5 | 13.7 |
| methylcyclohexane | n-butylbenzene | 95/5 | 10.3 |
| methylcyclohexane | isobutylbenzene | 95/5 | 0.7 |
| methylcyclohexane | sec-butylbenzene | 95/5 | 0.5 |
| methylcyclohexane | tert-butylbenzene | 95/5 | 0.5 |
| ethylcyclohexane | — | 100/— | 0.2 |
| ethylcyclohexane | sec-butylbenzene | 95/5 | 0.4 |
| ethylcyclohexane | tert-butylbenzene | 95/5 | 0.3 |

Despite similar Hildebrand solubility parameters (in brackets), the instant compounds of formula (I) sec-butyl benzene (8.4) and tert-butylbenzene (8.4) surprisingly provide a much better inertness to polycarbonate substrate in combination with an alicyclic compound, than n-butyl benzene (8.5).

The invention claimed is:

1. A polymeric optical recording medium substrate with a grooved side coated on the grooved side with a liquid composition, which does not swell or dissolve the polymeric substrate and provides superior groove filling, comprising
   a) from 0.1 to 20% by weight of a dye having a solid state absorption band maximum in the spectral region from 300 to 800 nm,
   b) from 0.5 to 79.9% by weight of a compound of formula

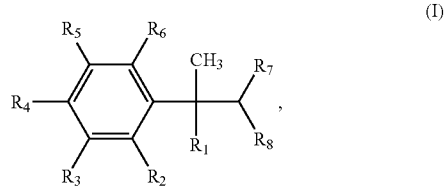

wherein $R_1$ to $R_8$ are H, $CH_3$ or $C_2H_5$, with the proviso that the total number of carbon atoms in $R_1$ to $R_8$ is 1 or 2, c) from 20% to 99.4% by weight of a linear, branched and/or cyclic non-aromatic hydrocarbon wherein the weight ratio of hydrocarbon to compound of formula (I) is from 17:1 to 76:1, and d) optionally from 0 to 99.4% by weight of one or more further components, all based on the weight of the solution.

2. A polymeric optical recording medium substrate with a grooved side coated on the grooved side with a liquid composition according to claim 1, wherein the compound of formula (I) is one or more compounds selected from the group consisting of o-cymene, m-cymene, sec-butylbenzene, tert-butylbenzene, 2-pentylbenzene, isopent-2-ylbenzene and tert-amylbenzene.

3. A polymeric optical recording medium substrate with a grooved side coated on the grooved side with a liquid composition according to claim 2, wherein the compound of formula (I) is sec-butylbenzene, tert-butylbenzene or a mixture thereof.

4. A polycarbonate optical recording medium substrate with a grooved side coated on the grooved side with a liquid composition according to claim 3.

5. A polycarbonate optical recording medium substrate with a grooved side coated on the grooved side with a liquid composition according to claim 2.

6. A polymeric optical recording medium substrate with a grooved side coated on the grooved side with a liquid composition according to claim 1, wherein the dye is a phthalocyanine.

7. A polycarbonate optical recording medium substrate with a grooved side coated on the grooved side with a liquid composition according to claim 6.

8. A polymeric optical recording medium substrate with a grooved side coated on the grooved side with a liquid composition according to claim 1, wherein the hydrocarbon is selected from cycloalkanes substituted by one or more $C_1$-$C_4$alkyl groups and/or having a boiling point of $\leq 170°$ C.

9. A polycarbonate optical recording medium substrate with a grooved side coated on the grooved side with a liquid composition according to claim 8.

10. A polymeric optical recording medium substrate with a grooved side coated on the grooved side with a liquid composition according to claim 1, wherein the dye is a copper or palladium phthalocyanine.

11. A polycarbonate optical recording medium substrate with a grooved side coated on the grooved side with a liquid composition according to claim 10.

12. A polymeric optical recording medium substrate with a grooved side coated on the grooved side with a liquid composition according to claim 1, wherein the hydrocarbon is methylcyclohexane, 1,2-dimethyl cyclohexane, ethyl cyclohexane or a mixture thereof.

13. A polycarbonate optical recording medium substrate with a grooved side coated on the grooved side with a liquid composition according to claim 12.

14. A polycarbonate optical recording medium substrate with a grooved side coated on the grooved side with a liquid composition according to claim 1.

15. A process for manufacturing an optical recording medium comprising a substrate with a grooved side, wherein the substrate is a polymeric substrate, a recording layer overlying the substrate on the grooved side, a reflective layer overlying the recording layer, and a protective layer overlying the reflective layer, which process comprises coating the grooved side of the substrate with a liquid composition, which does not swell or dissolve the polymeric substrate and provides superior groove filling, comprising a) from 0.1 to 20% by weight of a dye having a solid state absorption band maximum in the spectral region from 300 to 800 nm, b) from 0.5 to 79.9% by weight of a compound of formula

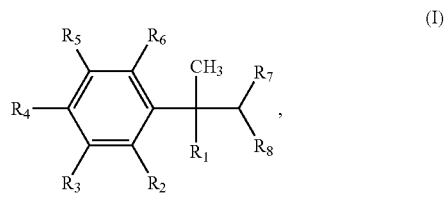

wherein $R_1$ to $R_8$ are H, $CH_3$ or $C_2H_5$, with the proviso that the total number of carbon atoms in $R_1$ to $R_8$ is 1 or 2, c) from 20% to 99.4% by weight of a linear, branched and/or cyclic non-aromatic hydrocarbon wherein the weight ratio of hydrocarbon to compound of formula (I) is from 17:1 to 76:1, and d) optionally from 0 to 99.4% by weight of one or more further components, all based on the weight of the solution to produce the recording layer.

16. A process for manufacturing an optical recording medium according to claim 15, wherein the substrate is a polycarbonate substrate.

17. A process for manufacturing an optical recording medium according to claim 15, wherein the compound of formula (I) in the liquid composition is one or more compounds selected from the group consisting of o-cymene, m-cymene, sec-butylbenzene, tert-butylbenzene, 2-pentylbenzene, isopent-2-ylbenzene and tert-amylbenzene.

18. A process for manufacturing an optical recording medium according to claim 15, wherein the compound of formula (I) in the liquid composition dye is a phthalocyanine.

19. A process for manufacturing an optical recording medium according to claim 15, wherein the hydrocarbon in the liquid composition is selected from cycloalkanes substituted by one or more $C_1$-$C_4$alkyl groups and/or having a boiling point of $\leq 170°$ C.

20. A process for manufacturing an optical recording medium according to claim 15, wherein the compound of formula (I) in the liquid composition is sec-butylbenzene, tert-butylbenzene or a mixture thereof.

* * * * *